United States Patent [19]

Ishikawa et al.

[11] Patent Number: 5,221,097
[45] Date of Patent: Jun. 22, 1993

[54] SEALING SYSTEM USING METAL GASKET WITH PROJECTION BEAD

[75] Inventors: Itsuo Ishikawa, Tokyo; Tsunekazu Udagawa, Ichikawa, both of Japan

[73] Assignee: Ishikawa Gasket Co., Ltd., Tokyo, Japan

[21] Appl. No.: 804,605

[22] Filed: Dec. 10, 1991

[51] Int. Cl.⁵ .............................................. F16J 15/32
[52] U.S. Cl. ............................ 277/235 B; 277/207 R; 277/214
[58] Field of Search ............... 277/235 B, 236, 211, 277/184, 207 R, 214, 215; 123/193.3

[56] References Cited

U.S. PATENT DOCUMENTS

| | | | |
|---|---|---|---|
| 222,388 | 12/1879 | Doty | 277/213 |
| 4,451,051 | 5/1984 | Nicholson | 277/235 B |
| 4,471,968 | 9/1984 | Schlaupitz | 277/211 X |
| 4,474,147 | 10/1984 | Hoopes | 277/235 B |
| 4,597,583 | 7/1986 | Incleng et al. | 277/235 B |
| 4,739,999 | 4/1988 | Ishii et al. | 277/235 D |
| 4,799,695 | 1/1989 | Yoshino | 277/235 B |
| 4,917,062 | 4/1990 | Tapper et al. | 123/193.3 |
| 5,112,066 | 5/1992 | Remmerfelt | 277/235 B |

FOREIGN PATENT DOCUMENTS

| | | | |
|---|---|---|---|
| 1297405 | 6/1969 | Fed. Rep. of Germany | 277/235 B |
| 1811789 | 6/1970 | Fed. Rep. of Germany | 277/235 B |
| 810728 | 3/1937 | France | 277/235 B |
| 3112166 | 11/1991 | Japan . | |
| 804848 | 2/1981 | U.S.S.R. | 277/235 B |
| 384379 | 12/1932 | United Kingdom | 277/213 |
| 2087023 | 5/1982 | United Kingdom | 277/235 B |

Primary Examiner—William A. Cuchlinski, Jr.
Assistant Examiner—Daniel DePumpo
Attorney, Agent, or Firm—Kanesaka and Takeuchi

[57] ABSTRACT

A sealing system is associated with an engine having two engine parts to be sealed, and includes a gasket situated between the engine parts. The engine parts include at least one annular groove around a hole to be sealed, and the gasket includes a bead extending outwardly from the gasket around the hole. The size o the bead is greater than that of the annular groove. When the gasket is tightened between the engine parts, the bead is compressed inside the groove and deforms to securely seal between the gasket and the engine parts. As a result, even if the engine part is slightly moved, the gasket can securely seal between the engine parts.

8 Claims, 1 Drawing Sheet

SEALING SYSTEM USING METAL GASKET WITH PROJECTION BEAD

BACKGROUND OF THE INVENTION AND RELATED ART STATEMENT

The present invention relates to a sealing system using a metal gasket with a bead projecting outwardly from the gasket for sealing between two engine parts.

In a metal gasket, it is common to form a bead on a metal plate around a hole to be sealed. When the gasket with the bead is tightened between the two engine parts, the bead is compressed by the engine parts, so that the bead is flattened and generally forms a plurality of corrugated beads to tightly seal around the hole to be sealed.

In a steel laminate gasket formed of a plurality of metal plates, although a bead may be formed on an outer plate to extend outwardly from the gasket, since the strong sealing pressure is generally formed on the compressed or corrugated beads, if the corrugated beads directly abut against an engine part, the engine part may be deformed or partly dented by the corrugated beads. Also, a sealing portion, i.e. top portions of the corrugated beads abutting against the engine part, is narrow.

Therefore, in case the bead is formed on the outer plate of the steel laminate gasket, the bead is formed to orient toward another plate of the gasket. Namely, the bead does not directly abut against the engine part.

In case the bead is formed on a middle plate between the two outer plates, when the bead is compressed, the bead is flattened and pushes the outer plate against the engine part. As a result, a relatively large sealing portion is formed by the bead, which orients toward the engine part.

As explained above, in case the bead is formed on the middle plate, relatively large sealing pressure is formed between the gasket and the engine parts. Therefore, the bead is generally formed in the middle plate around a hole to be sealed.

In a diesel engine, very high pressure is formed inside a cylinder bore when actuated, such as 120-140 kg/cm$^2$. Lately, the combustion pressure is going to increase further. Consequently, although a cylinder head is tightly attached to a cylinder block by bolts, the cylinder head moves or vibrates in the directions toward and away from the cylinder block.

In case the pressure of 120 kg/cm$^2$ is formed inside the cylinder bore, the cylinder head moves about 4 micro meters in a vertical direction. In case the pressure of 140 kg/cm$^2$ is formed, the cylinder head moves about 5 micro meters.

In the diesel engine, although a steel laminate gasket with beads is installed between the cylinder head and the cylinder block, the gasket may not absorb such movement of the cylinder head. Especially, as the sealing ability decreases in a long usage, leakage may occur between the cylinder head and the cylinder block.

Namely, in a conventional gasket, a bead formed on a plate of a gasket is substantially completely flattened when compressed, so that elasticity of the bead is not sufficiently utilized. Therefore, it is difficult to completely seal between the engine parts which vibrate severely.

Accordingly, one object of the present invention is to provide a sealing system with a metal gasket, which can seal tightly even when high pressure is formed between two engine parts.

Another object of the present invention is to provide a sealing system as stated above, which can seal securely even when an engine part is slightly moved.

A further object of the present invention is to provide a sealing system as stated above, which is made simply and can be manufactured economically.

A still further object of the present invention is to provide the metal gasket, which can securely seal between the two engine parts.

Further objects and advantages of the invention will be apparent from the following description of the invention.

SUMMARY OF THE INVENTION

In accordance with a sealing system of the present invention, a gasket is installed between two engine parts. The engine parts are provided with at least one hole to be sealed, and at least one annular groove around the hole. The annular grooves may be formed on both engine parts.

The gasket is formed of at least one first metal plate extending substantially throughout the entire area of the engine parts. The first metal plate is provided with at least one first hole corresponding to the hole to be sealed and a first bead formed around the first hole. The first bead extends outwardly from the first metal plate and has a size greater than a size of the annular groove of the engine part.

Therefore, when the first metal plate is situated between the engine parts, the first bead is located at least partly inside the annular groove. Then, when the engine parts are tightened, the first bead is located substantially completely inside the annular groove and is deformed therein. As a result, the gasket can seal securely between the two engine parts.

In particular, when the engine parts and the gasket are assembled, since the size of the first bead is greater than the inner size of the annular groove, the first bead is not completely located inside the annular groove. The bead may be partly located inside or situated adjacent to the annular groove. In this condition, when the engine parts are tightened, the first bead is forcibly located inside the annular groove, and is compressed thereat.

As a result, the first bead deforms inside the annular groove and is strongly pushed to the inside of the annular groove. The first bead touches the inner portion of the annular groove at least at three points, i.e. edges and the center of the annular groove. Therefore, even if the engine part with the annular groove slightly moves vertically, the gasket can securely seal around the first hole.

The gasket may be formed of one metal plate. In this case, two beads may be formed to extend in opposite directions by changing the distances to the beads from the center of the hole. The gasket may be made of a plurality of metal plates. The outer plates may have the beads extending outwardly from the gasket, and a middle plate may have an additional bead or a sealing device of sealing between the plates.

Also, a soft plate may be installed inside the annular groove for improving seal between the engine part and the bead. A soft coating may be formed inside the annular groove.

DETAILED DESCRIPTION OF THE PREFERRED EMBODIMENTS

Figure 1:
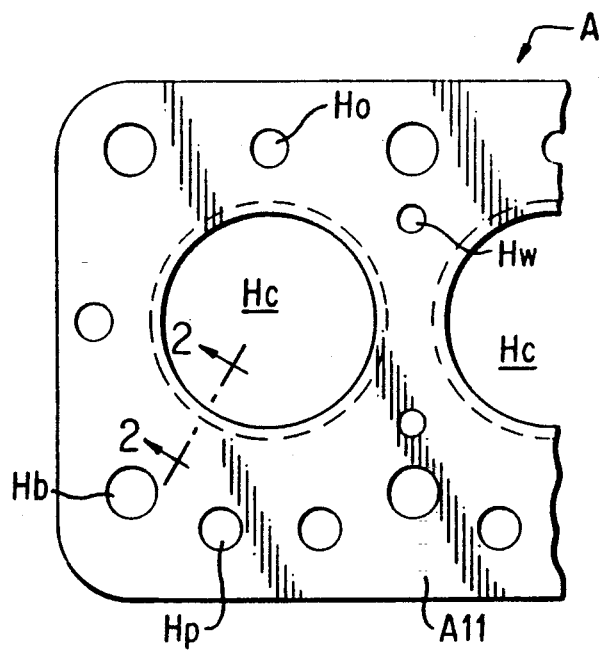
FIG. 1 is a plan view of a part of a first embodiment of a metal gasket of the invention.
Figure 2:
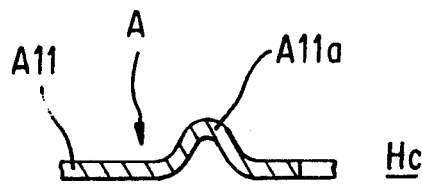
FIG. 2 is an enlarged section view taken along line 2—2 in FIG. 1.
Figure 3:
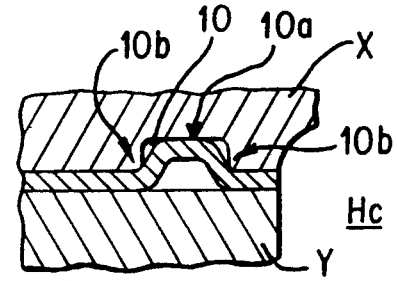
FIG. 3 is an explanatory section view for showing a condition that the gasket is compressed between a cylinder block and a cylinder head.

Referring to FIGS. 1-3, a first embodiment of a sealing system of the invention is shown. The sealing system is associated with an engine having a cylinder head X and a cylinder block Y, and includes a gasket A extending substantially throughout the entire area between the cylinder head X and the cylinder block Y.

In the sealing system of the present invention, the gasket A includes a plurality of cylinder bores Hc, water holes Hw, oil holes Ho, bolt holes Hb and push rod holes Hp, as in the conventional gasket and shown in FIG. 1. The engine also includes cylinder bores and other holes corresponding to those of the gasket A as shown in FIG. 1.

In the sealing system as shown in FIG. 1, areas around the cylinder bores Hc are sealed in accordance with the present invention. Areas around the water holes Hw and oil holes Ho are sealed in the conventional devices, explanation of which is, therefore, omitted. If required, the sealing systems used in the cylinder bores may be used around the water holes Hw and oil holes Ho.

In the first embodiment of the sealing system, the cylinder head X is provided with an annular groove 10 around the cylinder bore Hc. The annular groove 10 has a rectangular shape in cross section, but the groove 10 may have any other shape.

The gasket A is formed of a metal plate A11 with resiliency. outwardly from the plate A11 around the cylinder bore Hc. The bead A11a has a height higher than that of the groove 10, and a bottom width, which is substantially the same as the width of the groove 10.

When the plate A11 is situated between the cylinder head X and the cylinder block Y, the bead A11a is located inside the groove 10. Since the height of the bead A11a is higher than the height of groove 10, the cylinder head X is located at some distance away from the metal plate A11.

When the cylinder head X and the cylinder block Y are tightened by means of bolts (not shown), the bead A11a is strongly compressed inside the groove 10. Since the height of the bead A11a is higher than that of the groove 10, the bead A11a is pushed downwardly and expands laterally outwardly against side surfaces of the groove 10. Therefore, the bead A11a strongly abuts against the groove 10 at a center portion 10a and side edge portions 10b.

In a diesel engine, the cylinder head X is liable to move vertically relative to the cylinder block Y due to high combustion pressure. However, since the bead A11a of the gasket A is securely retained inside the groove 10 of the cylinder head X, even if the cylinder head X is slightly moved, the sealing between the cylinder head X and the gasket A is securely retained. Fluid inside the cylinder bore Hc does not leak between the gasket A and the cylinder head X.

Figure 4:
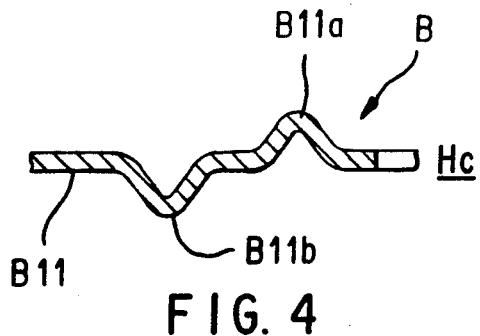
FIG. 4 is a section view, similar to FIG. 2, of a second embodiment of the invention.

FIG. 4 shows a second embodiment B of the sealing system of the invention, wherein the cylinder head X includes the groove 10, and a metal plate B11 includes a bead B11a, similar to the first embodiment as shown in FIG. 3. However, the cylinder block Y includes a groove (not shown) laterally outside the groove 10, and the metal plate B11 includes a bead B11b extending downwardly from the plate B11. The height of bead B11b is taller than that of the groove formed in the cylinder block Y.

When the metal plate B11 is situated between the cylinder head X and the cylinder block Y, the beads B11a, B11b are located in the respective grooves. When the cylinder head X and the cylinder block Y are tightened, the beads B11a, B11b are strongly compressed inside the respective grooves. The bead B11a seals between the plate B11 and the cylinder head X, while the bead B11b seals between the plate B11 and the cylinder block Y. The metal plate B11 can securely seal between the cylinder head X and the cylinder block Y.

Figure 5:
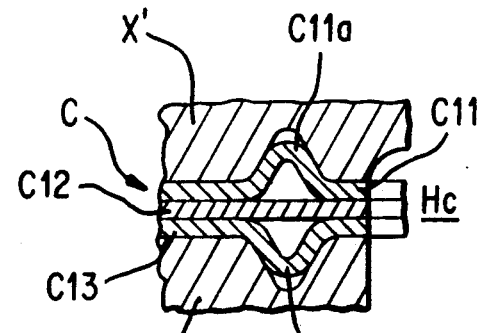
FIG. 5 is an explanatory section view, similar to FIG. 3, for showing a third embodiment of the invention.

FIG. 5 shows a third embodiment of the sealing system of the invention, wherein the cylinder head X' and the cylinder block Y' have grooves facing each other around the cylinder bore Hc. A gasket C for the third embodiment is formed of an upper plate C11 with a bead C11a, a middle plate C12, and a lower plate C13 with a bead C13a.

When the gasket C is situated between the cylinder head X' and the cylinder block Y', the beads C11a, C13a are located in the respective grooves of the cylinder head X' and the cylinder block Y'. When the cylinder head X' and the cylinder block Y' are tightened, the beads C11a, C13a are compressed in the respective grooves, similar to the embodiment as shown in FIG. 3. The gasket C can securely seal between the cylinder head X, and the cylinder block Y'.

Figure 6:
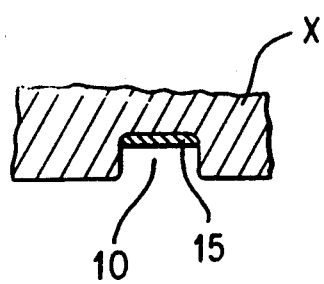
FIGS. 6 and 7 are section views for showing modifications of an annular groove.

FIG. 6 shows the cylinder head X with the groove 10, in which a soft plate 15 is disposed. The soft plate 15 may be made of one material, such as rubber, resin or graphite sheet. The soft plate 15 may be made of a metal plate with soft materials on both sides. The soft materials may be rubber, resin or graphite sheet.

Figure 7:
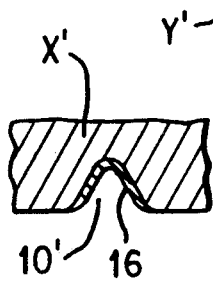

FIG. 7 shows the cylinder head X' with the groove 10', wherein a coating 16 is applied inside the groove 10'. Rubber or resin used for a gasket may be used for this coating 16.

When the soft plate 15 or coating 16 as shown in FIGS. 6 and 7 is formed inside the groove, sealing ability between the bead and the cylinder head is improved. Namely, when the bead is compressed inside the groove, fluid does not substantially flow beyond the groove. Needless to say, the soft plate 15 or coating 16 may be installed inside the groove of the cylinder blook.

In the gasket of the present invention, at least one bead extends outwardly from the gasket, and is located in a groove of the cylinder head and/or the cylinder block. The size of the bead is greater than that of the groove. The width as well as the height of the bead may be greater than those of the groove.

In case the gasket is formed of a plurality of metal plates, the upper and lower plates may have the beads engaging the grooves of the cylinder head and the cylinder block. Also, one of the upper and lower plates may be curved to surround the cylinder bore, or a grommet may be installed around the cylinder bore to prevent fluid from entering into spaces between the plates. Further, a middle plate may have a bead to resiliently seal between the plates when the gasket is tightened.

While the invention has been explained with reference to the specific embodiments of the invention, the explanation is illustrative and the invention is limited only by the appended claims.

What is claimed is:

1. A sealing system for engine parts, comprising,
two engine parts to be sealed therebetween, said engine parts having at least one hole to be sealed and at least one annular groove around the hole with predetermined dimension and a shape, and
a gasket situated between the two engine parts, said gasket being formed of at least one first metal plate extending substantially throughout an entire area of the engine parts to be sealed, said first metal plate having at least one first hole corresponding to the hole to be sealed and a first bead formed around the first hole to extend outwardly from the first metal plate, said first bead having at least one dimension greater than the dimension of the annular groove of the engine part, a space behind the bead and a shape different from that of the groove so that when the first metal plate is situated between the engine parts, said first bead is located partly inside the annular groove, and when the engine parts are tightened, the first bead is deformed inside the annular groove according to the shape of the annular groove while changing a shape of the space behind the bead to thereby securely seal between the gasket and the engine part inside the annular groove.

2. A sealing system according to claim 1, wherein said gasket further includes a second metal plate laminated over the first metal plate at a side where the first bead does not project, said second metal plate having a second bead extending in a direction opposite to the first bead, said engine part situated opposite to the engine part with the annular groove having a second annular groove, said second bead, when the gasket is tightened between the engine parts, being located and deformed inside the second annular groove to securely seal between the gasket and the engine part.

3. A sealing system according to claim 1, further comprising a soft plate situated inside the annular groove to improve sealing ability between the engine part and the gasket.

4. A sealing system according to claim 3, wherein said soft plate may be selected from a group consisting of gum, resin, graphite sheet, and a metal plate with soft coatings.

5. A sealing system for engine parts, comprising,
two engine parts to be sealed therebetween, said engine arts having at least one hole to be sealed and at least one annular groove around the hole with predetermined dimension,
a gasket situated between the two engine parts, said gasket being formed of at least one first metal plate extending substantially throughout an entire area of the engine parts to be sealed, said first metal plate having at least one first hole corresponding to the hole to be sealed and a first bead formed around the first hole to extend outwardly from, the first metal plate, said first bead having at least one dimension greater than the dimension of the annular groove of the engine part so that when the first metal plate is situated between the engine parts, said first bead is located at least partly inside the annular groove, and when the engine parts are tightened, the first bead is deformed inside the annular groove to thereby securely seal between the gasket and the engine part inside the annular groove, and
at least one coating situated inside the annular groove to improve sealing ability between the engine part and the gasket.

6. A sealing system according to claim 1, wherein said groove has an entrance with side edge portions, a width at the entrance, a depth and a bottom, and said first bead has two side portions, a height and a bottom width, said height of the first bead being greater than the depth of the groove so that when the engine parts are tightened, the height of the first bead is reduced to make the first bead to firmly contact with the bottom and the side edge portions of the groove to thereby seal between the engine part and the gasket.

7. A sealing system according to claim 6, wherein said bottom width of the first bead is substantially the same as the width of the groove at the entrance, said first bead, when compressed, laterally outwardly expanding against side faces of the groove to seal therebetween.

8. A sealing system according to claim 1, wherein said groove has an entrance with said edge portions and inclined side walls converging together, and said first bead has two side portions, said first bead being formed greater in size than the groove so that when the engine parts are tightened, the first bead is forcibly located inside the groove to have strong contact between the two side portions of the first head and the side edge portions and the inclined side walls of the groove to thereby seal between the engine part and the gasket.

* * * * *

UNITED STATES PATENT AND TRADEMARK OFFICE
CERTIFICATE OF CORRECTION

PATENT NO. : 5,221,097

DATED : June 22, 1993

INVENTOR(S) : Itsuo Ishikawa et al

It is certified that error appears in the above-identified patent and that said Letters Patent is hereby corrected as shown below:

In ABSTRACT, line 6, please change "size o the" to --size of the--.

Col. 6, line 14, "from, the" should read --from the--

Signed and Sealed this

Eighteenth Day of January, 1994

Attest:

BRUCE LEHMAN

*Attesting Officer*    *Commissioner of Patents and Trademarks*